United States Patent
Kato et al.

(10) Patent No.: US 6,512,765 B1
(45) Date of Patent: Jan. 28, 2003

(54) EXCHANGE

(75) Inventors: Yoshiharu Kato, Kawasaki (JP); Ryo Takajitsuko, Kawasaki (JP); Hidetoshi Iwasa, Yokohama (JP); Kiyofumi Mitsuze, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/228,672

(22) Filed: Jan. 12, 1999

(30) Foreign Application Priority Data

Jun. 5, 1998 (JP) .......................................... 10-157084

(51) Int. Cl.[7] .............................................. H04J 11/00
(52) U.S. Cl. ....................... 370/369; 370/370; 370/372; 370/375; 370/388; 370/220; 370/222; 370/223; 370/224; 370/297
(58) Field of Search ................................ 370/372, 375, 370/376, 468, 535–537, 276, 294, 369, 370, 386, 540–545, 362, 424, 220, 223, 217, 222

(56) References Cited

U.S. PATENT DOCUMENTS

| | | | |
|---|---|---|---|
| 3,925,621 A | * 12/1975 | Collins et al. .......... | 179/15 AL |
| 4,380,061 A | * 4/1983 | Mori et al. .................... | 370/16 |
| 4,455,645 A | * 6/1984 | Mijioka et al. ............... | 370/16 |
| 4,701,907 A | * 10/1987 | Collins ......................... | 370/63 |
| 5,479,396 A | * 12/1995 | Kusano ........................ | 370/16 |
| 6,049,525 A | * 4/2000 | Takahashi et al. .......... | 370/223 |
| 6,122,249 A | * 9/2000 | Mochizuki et al. ......... | 370/220 |
| 6,137,800 A | * 10/2000 | Wiley et al. ................. | 370/396 |

FOREIGN PATENT DOCUMENTS

| | | |
|---|---|---|
| JP | 60-65640 | 4/1986 |
| JP | 61-224538 | 10/1986 |

\* cited by examiner

*Primary Examiner*—Douglas Olms
*Assistant Examiner*—Van Nguyen
(74) *Attorney, Agent, or Firm*—Katten Muchin Zavis Rosenman

(57) ABSTRACT

An exchange equipment using STM able to achieve an improvement of an efficiency of use and an improvement of ease of increase of terminal cards, that is, an STM type exchange, including a time switch, for performing exchange processing of time division multiplexed data, wherein a ring highway is connected via a terminal common unit to an upstream highway and a downstream highway coupled to this time switch via a highway interface unit or directly and wherein a plurality of terminal cards are connected to this ring highway. Each terminal card is provided with an add/drop unit which drops and adds the data from and to an assigned time slot on the ring highway according to control information indicating time slot assignment information determined by the control unit and adds the data and with a card control unit which controls the add/drop unit.

5 Claims, 10 Drawing Sheets

EXCHANGE

BACKGROUND OF THE INVENTION

1. Field of the Invention

The present invention relates to an exchange which uses the synchronous transfer mode (STM) and which performs processing for exchange of voice and other various types of data. Usually, in time division multiplexing, it is possible to assign a number of time slots according to the bandwidth of transmission of the data. Accordingly, image data, which requires a broader transmission bandwidth than voice data, can also be transmitted by time division multiplexing together with voice data etc. There is a demand, however, to enable more efficient processing for exchange of data having various transmission bandwidths.

2. Description of the Related Art

As will be explained in detail later by referring to the drawings, an exchange of an example of the related art is constituted by a time switch (TSW), highway interface units (HWI) for multiplexing and demultiplexing the data, terminal common units, terminal cards, highways between the time switch and the highway interface units, and highways between the highway interface units and the terminal common units.

In such an exchange of the related art, when an increase of the terminal cards is necessary, once for example the sum of the number of time slots for the bandwidths of the terminal cards to be accommodated by one terminal common unit reaches the number of time slots on the highway between the highway interface unit and the terminal common unit, the terminal common unit can no longer connect more terminal cards. In this case, the terminal cards to be increased are accommodated by the terminal common unit by increasing the number of highways and terminal common units.

Generally, further, there is an upper limit on the number of the terminal cards which can be accommodated by any single terminal common unit. For this reason, there are cases where the-sum of the number of time slots for the bandwidths of the terminal cards which can be accommodated by a terminal common unit is smaller than the number of time slots on the highway between the highway interface unit and the terminal common unit. Namely, even if it is possible to increase the number of terminal cards from the standpoint of the capacity of the highway, the number of terminal cards cannot actually be increased due to the limit on the number of terminal cards which can be connected to the terminal common unit. Therefore, it is necessary to increase the number of terminal common units and highways to accommodate, by the terminal common unit, the terminal cards to be increased.

Namely, in an exchange of the example of the related art, even if there are idle time slots on a highway, the number of terminal cards cannot necessarily be increased, so there has been the problem in that the efficiency of use was low.

SUMMARY OF THE INVENTION

In consideration with the above problem, an object of the present invention is to achieve effective utilization of the highway.

To attain the above object, the present invention provides an STM type exchange, including a time switch, for performing exchange processing of time division multiplexed data, wherein a ring highway is connected via a terminal common unit to an upstream highway and a downstream highway coupled to this time switch via a highway interface unit or directly and wherein a plurality of terminal cards are connected to this ring highway. Each terminal card is provided with an add/drop unit which drops and adds the data from and to an assigned time slot on the ring highway according to control information indicating time slot assignment information determined by the control unit and adds the data and with a card control unit which controls the add/drop unit. By this, it is possible to improve the efficiency of use and to further facilitate an increase of the number of terminal cards in an exchange using STM.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 10:
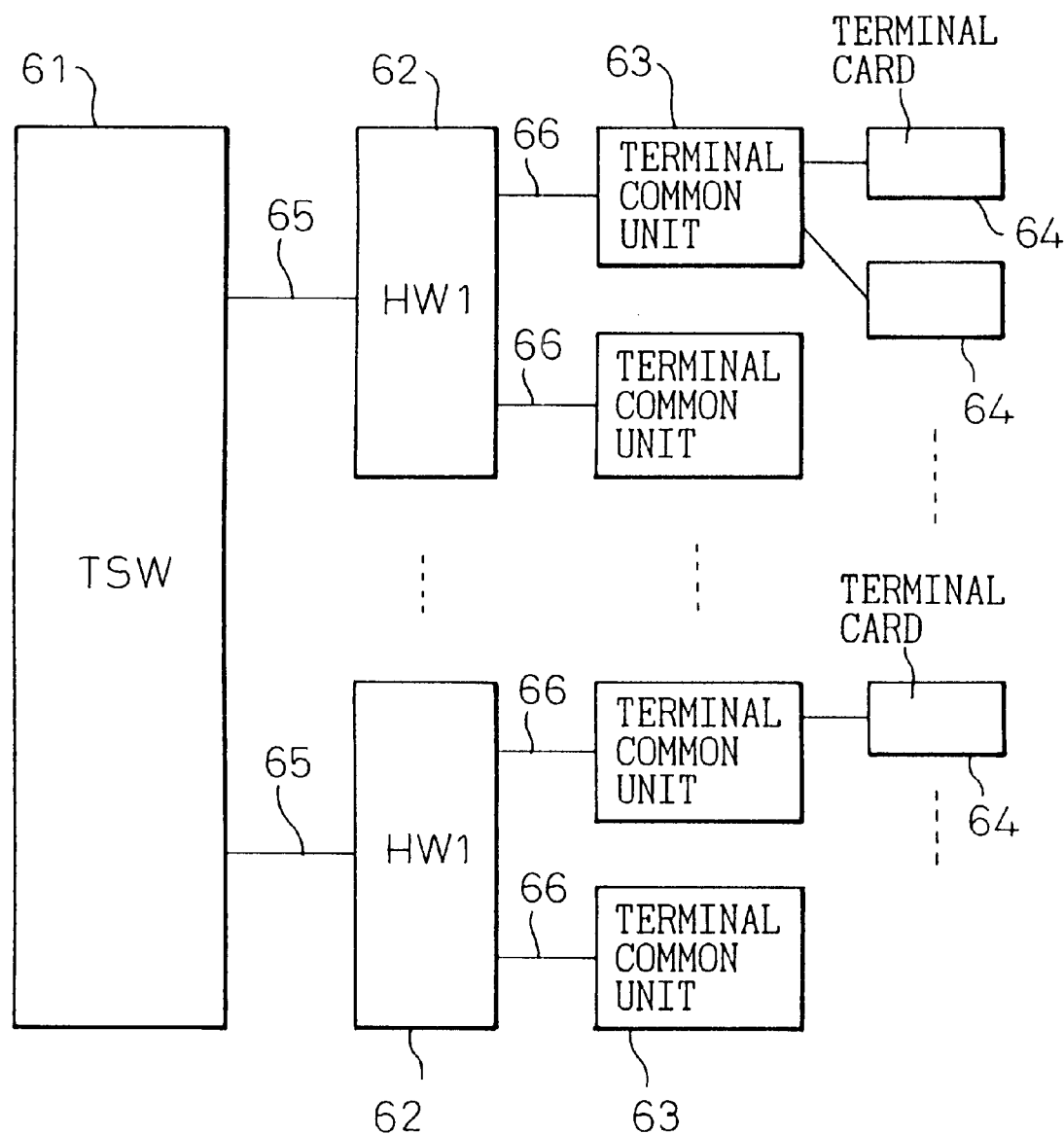
FIG. 10 is an explanatory view of the principal parts in an exchange of the related art.

FIG. 10 is an explanatory view of principal parts of an exchange of an example of the related art, in which 61 denotes a time switch (TSW), 62 a highway interface unit (HWI) for multiplexing and demultiplexing data, 63 a terminal common unit, 64 a terminal card, 65 a highway between the time switch 61 and the highway interface unit 62, and 66 a highway between the highway interface unit 62 and the terminal common unit 63.

A plurality of highway interface units 62 are connected to the time switch 61 via the highways 65, a plurality of terminal common units 63 are connected to the highway interface units 62 via the highways 66, a plurality of terminal cards 64 are connected to the terminal common units 63, and subscriber terminals, illustrations of which are omitted, are connected to the terminal cards 64.

The time switch 61 is the time switch used for the time division switching and includes a space switch, not illustrated. The time switch 61 interchanges the time slots and connects highways. The highway interface units 62 multiplex and demultiplex signals between the highways 65 and 66, while the terminal common units 63 assign time slots, the numbers of which conform to the available bandwidths of the terminal cards 64, onto the highway 66.

As already explained, when an increase of the terminal cards 64 is necessary, once for example the sum of the number of time slots for the bandwidths of the terminal cards 64 to be accommodated by one terminal common unit 63 reaches the number of time slots on the highway 65 between the highway interface unit 62 and the terminal common unit 63, the terminal common unit 63 can no longer connect more terminal cards 64. In this case, the terminal cards 64 to be increased are accommodated by the terminal common unit 63 by increasing the number of highways 65 and terminal common units 63.

As also explained earlier, generally, further, there is an upper limit on the number of the terminal cards 64 which can be accommodated by any single terminal common unit 63. For this reason, there are cases where the sum of the number of time slots for the bandwidths of the terminal cards 64 which can be accommodated by a terminal common unit 63 is smaller than the number of time slots on the highway 65 between the highway interface unit 62 and the terminal common unit 63. Namely, even if it is possible to increase the number of terminal cards 64 from the standpoint of the capacity of the highway 65, the number of terminal cards 64 cannot actually be increased due to the limit on the number of terminal cards 64 which can be connected to the terminal common unit 63. Therefore, it is necessary to increase the number of terminal common units 63 and the highways 65 to accommodate, by the terminal common unit 63, the terminal cards 64 to be increased.

Namely, in the exchange of the example of the related art, even if there are idle time slots on a highway 65, the number of the terminal cards 64 cannot necessarily be increased, so there has been the problem in that the efficiency of use was low. The present invention is designed for effective utilization of the highways.

FIGS. 1 to 9 show aspects of the present invention. These may be summarized as follows:

According to a first aspect of the present invention, there is provided an exchange for performing exchange processing, by a time switch, of time division multiplexed data provided with a downstream highway 5a and an upstream highway 5b coupled to the time switch 1 for switching time slots and highways; a ring highway 7 connected to these upstream and downstream highways via a terminal common unit 3; and a terminal card 4 containing an add/drop unit connected to this ring highway 7 and the dropping and adding the data of an assigned time slot on ring highway and containing a card control unit for controlling this add/drop unit. Accordingly, it becomes possible to increase the number of terminal cards 4 until there are no longer any idle time slots on the ring highway 7 and therefore to improve the efficiency of use. Further, since there are also cases where the number of time slots used is small due to the volume of calls, it becomes possible to accommodate more terminal cards 4 than the number of time slots on the ring highway 7.

According to a second aspect of the present invention, a plurality of terminal common units 3 connecting ring highways 7 are connected in series with the upstream and downstream highways coupled to the time switch to constitute a ring-like configuration as a whole and terminal cards 4 are connected to the ring highways 7.

According to a third aspect of the present invention, provision is made of a control unit 8 for controlling the interchanging of time slots in the time switch 1 and controlling the assignment of time slots to the terminal cards 4. This time slots can be assigned to the terminal cards 4 via the terminal common unit 3.

According to a fourth aspect of the present invention, the time switch 1, the terminal common unit 3, the upstream and downstream highways, and the ring highway are duplexed to a working side and a protection side, the terminal cards are connected to the duplexed ring highways, and working and protection switch control units are provided in the terminal common units and the terminal cards.

According to a fifth aspect of the present invention, the time switch 1, the terminal common unit 3, the upstream and downstream highways, and the ring highway are duplexed to a working side and a protection side, provision is made of highways cross-connecting with the duplexed upstream and downstream highways between the duplexed time switches and terminal common units, provision is made of a selective switch unit, in the terminal common unit, for selecting a working side of the duplexed highways and cross-connecting highways, and provision is made of a selective switch unit, in the terminal card, the duplexed ring highways.

Next, detailed embodiments of the present invention will be explained with reference to the drawings.

Figure 1:
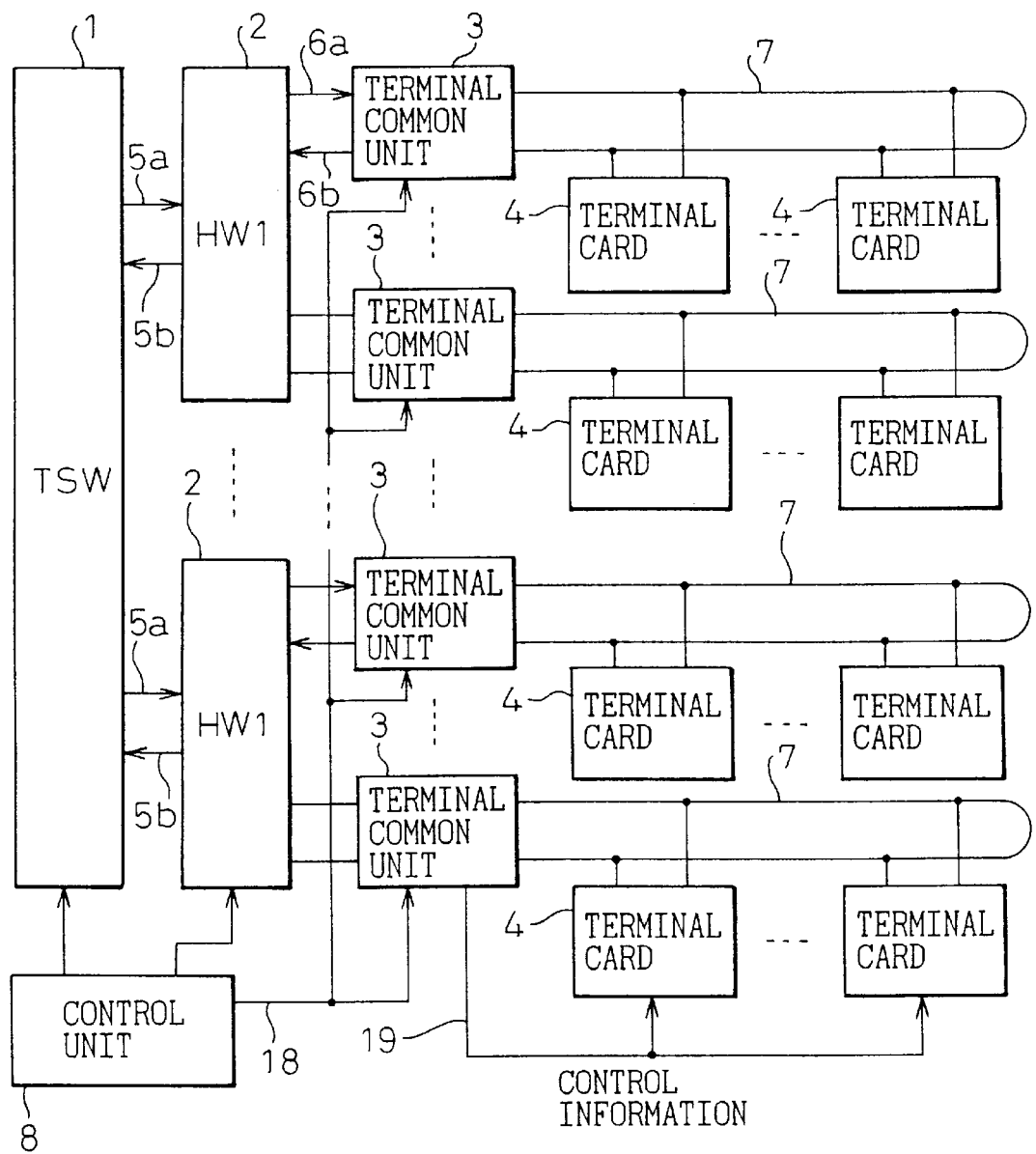
FIG. 1 is an explanatory view of a first embodiment of the present invention.

FIG. 1 is an explanatory view of a first embodiment of the present invention, in which 1 denotes a time switch (TSW), 2 a highway interface unit (HWI), 3 a terminal common unit, 4 a terminal card, 5a and 5b downstream and upstream highways between the time switch 1 and the highway interface unit 2, 6a and 6b downstream and upstream highways between the highway interface unit 2 and the terminal common unit 3, 7 a ring highway, and 8 a control unit.

Figure 2:
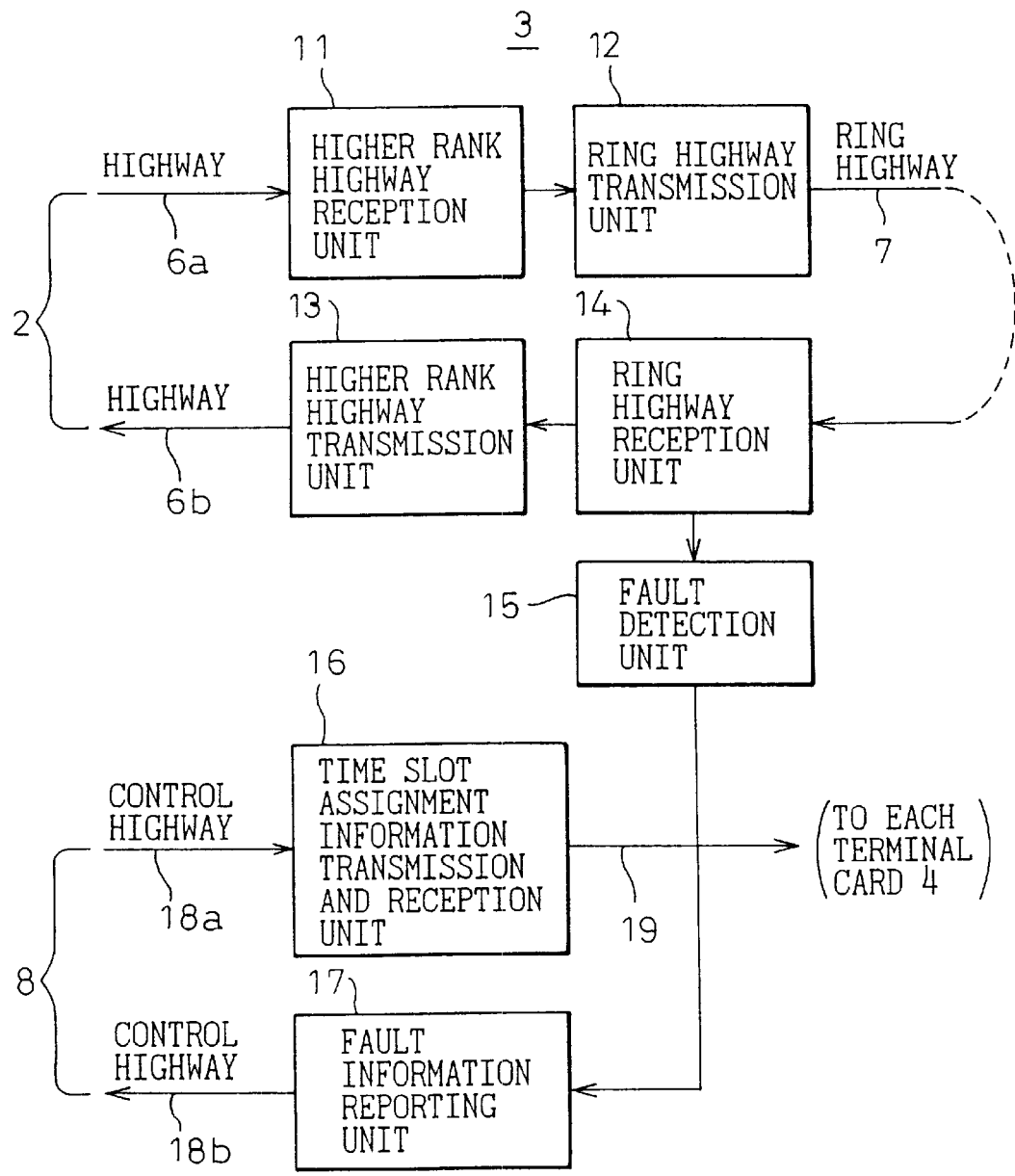
FIG. 2 is an explanatory view of a terminal common unit based on a first embodiment of the present invention.

Each of the terminal common units 3 connects a downstream highway 6a and an upstream highway 6b with a ring highway 7 to form a ring highway 7 configured as to extend the downstream highway 6a and upstream highway 6b (FIG. 2). One or more terminal cards 4 are connected to this ring highway 7. The control unit 8 corresponds to a central processing unit of the exchange such as a processor. The control unit 8 controls the interchanging of the time slots in the time switch 1 etc., controls the highway interface unit 2, and further controls the assignment of time slots to the terminal cards 4.

The terminal common unit 3 specifies terminal cards 4 individually connected to the ring highway 7 and transmits control information, from the control unit 8, indicating the assigned time slots to the specified terminal cards. By this, the terminal cards 4 drop and add the data in the time slots on the ring highway 7 according to the control information indicating the assigned time slots. Note that this control information is transmitted to all the terminal cards 4 which are connected to each ring highway 7 coupled to each terminal common unit 3, but only the lower end cards 4 are specifically illustrated to receive the control information. Further, the highway interface unit 2 demultiplexes time slots on the downstream highway 5a and the downstream highway 6a corresponding to each terminal common unit 3 in the same way as the example of the related art and multiplexes time slots on the upstream highway 6b and the upstream highway 5b corresponding to each terminal common unit 3.

Since time slots on the ring highway 7 are assigned to the terminal cards 4 in this way, it becomes possible to increase the number of the terminal cards 4 until the sum of the time slots for the bandwidths to be used by all of the terminal cards 4 connected to this ring highway 7 reaches the number of time slots on the ring highway 7. Further, when the volume of calls is small, the number of the time slots used is also small, therefore it is possible to accommodate more terminal cards 4 than the number of time slots inherently provided by the ring highway 7. Accordingly, the time slots of the ring highway 7 can be effectively utilized. Further, since the terminal cards 4 are connected to a ring highway 7, the limit due to the number of terminal cards which can be accommodated by a terminal common unit 3 is eliminated. Accordingly, in the case of the terminal cards using a small number of time slots, a large number of terminal cards can be accommodated.

FIG. 2 is an explanatory view of a terminal common unit of the first embodiment of the present invention, in which 11 is a higher rank highway reception unit, 12 is a ring highway transmission unit, 13 is a higher rank highway transmission unit, 14 is a ring highway reception unit, 15 is a fault detection unit, 16 is a time slot assignment information transmission and reception unit, and 17 is a fault information reporting unit.

The terminal common unit 3 (refer to FIG. 1) connects the downstream highway 6a connected with the highway interface unit 2 (refer to FIG. 1) to the ring highway 7 via the higher rank highway reception unit 11 and the ring highway transmission unit 12 and connects the upstream highway 6b to the ring highway 7 via the ring highway reception unit 14 and the higher rank highway transmission unit 13. Accordingly, the ring highway 7 is configured as to extend the highways 6a and 6b between the highway interface unit 2 and the terminal common unit 3.

Further, the terminal common unit 3 is connected to the time slot assignment information transmission and reception unit 16 and the fault information reporting unit 17 via the control highways 18a and 18b connected with the control unit 8. The time slot assignment information is notified to each terminal card 4 (refer to FIG. 1) via the time slot assignment information transmission and reception unit 16. Further, the fault detection unit 15 is configured to monitor the existence of a fault in each unit. Further, for example, it monitors the reception data, transmitted via the ring highway 7, by the ring highway reception unit 14. It is configured to notify the fault information to the control unit 8 via the fault information reporting unit 17 when detecting an abnormality on the ring highway 7.

Figure 3:
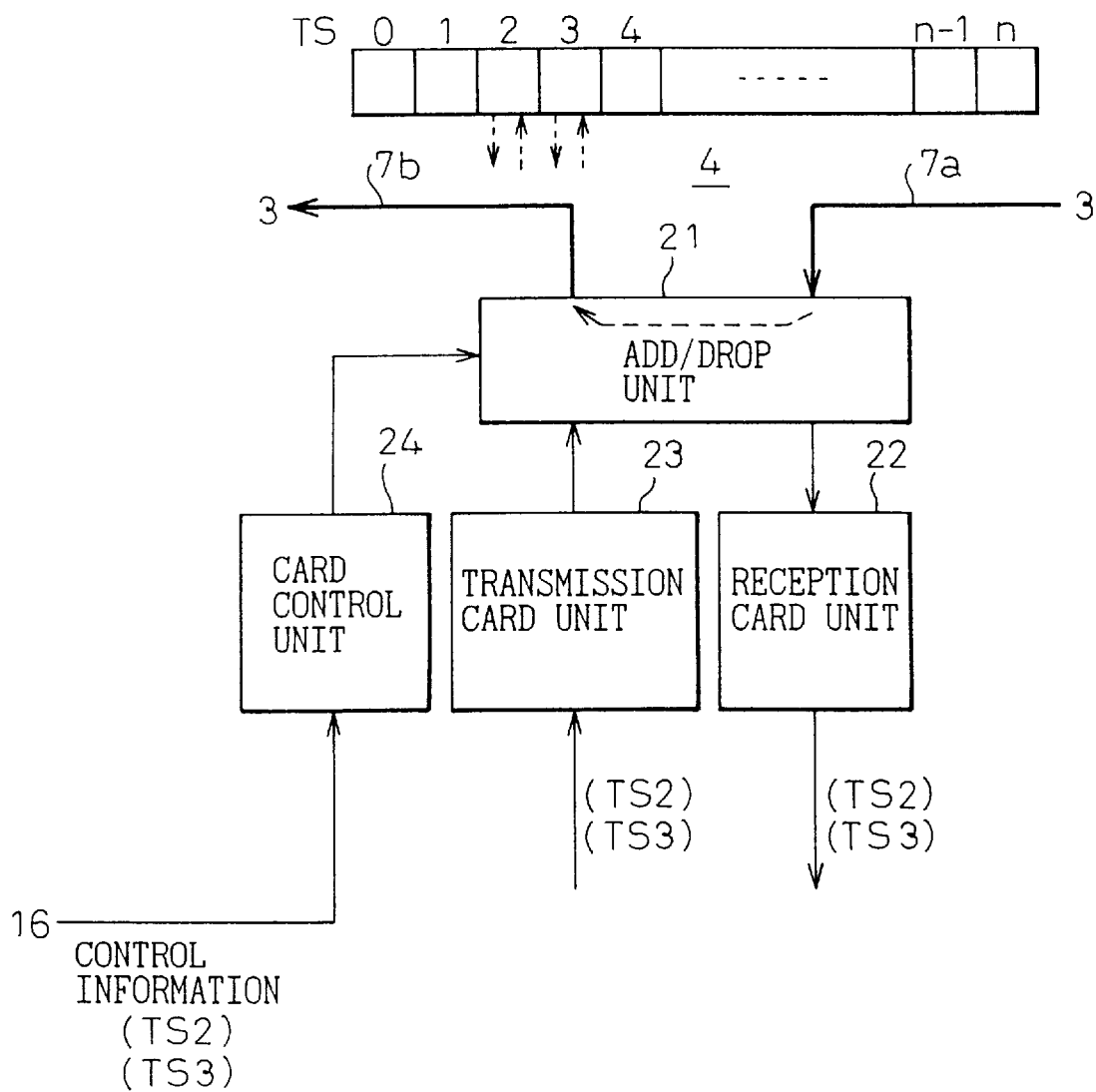
FIG. 3 is an explanatory view of a terminal card based on the first embodiment of the present invention.

FIG. 3 is an explanatory view of the terminal card of the first embodiment of the present invention, in which 21 is an add/drop unit, 22 is a reception card unit, 23 is a transmission card unit, 24 is a card control unit, and 7a and 7b are ring highways. Time slots TS0 to TSn on these ring highways 7a and 7b are shown at the upper position of the figure.

For example, the control information from the time slot assignment information transmission and reception unit 16 of the terminal common unit 3 is input to the card control unit 24. This card control unit 24 controls the time slots for add and drop operations in the add/drop unit 21. For example, when the time slots TS2 and TS3 are assigned by the control information, the card control unit 24 controls the add/drop unit 21 to drop the time slots TS2 and TS3 from among the time slots on the ring highway 7a and input them to the reception card unit 22 and to add the data from the transmission card unit 23 to the time slots TS2 and TS3 and transmit them to the ring highway 7b.

Note that the time slot TS0 can be used as a time slot for maintenance and inspection of fault information etc. Further, when assigning a plurality of time slots to the terminal cards 4, it is not necessary to assign continuous time slots $TS_K$, $TS_{K+1}$, $TS_{K+2}$, ... in one frame. It is possible to assign any time slots. That is, it is possible to assign any of the time slots TS1 to TSn according to the control information.

Figure 4:
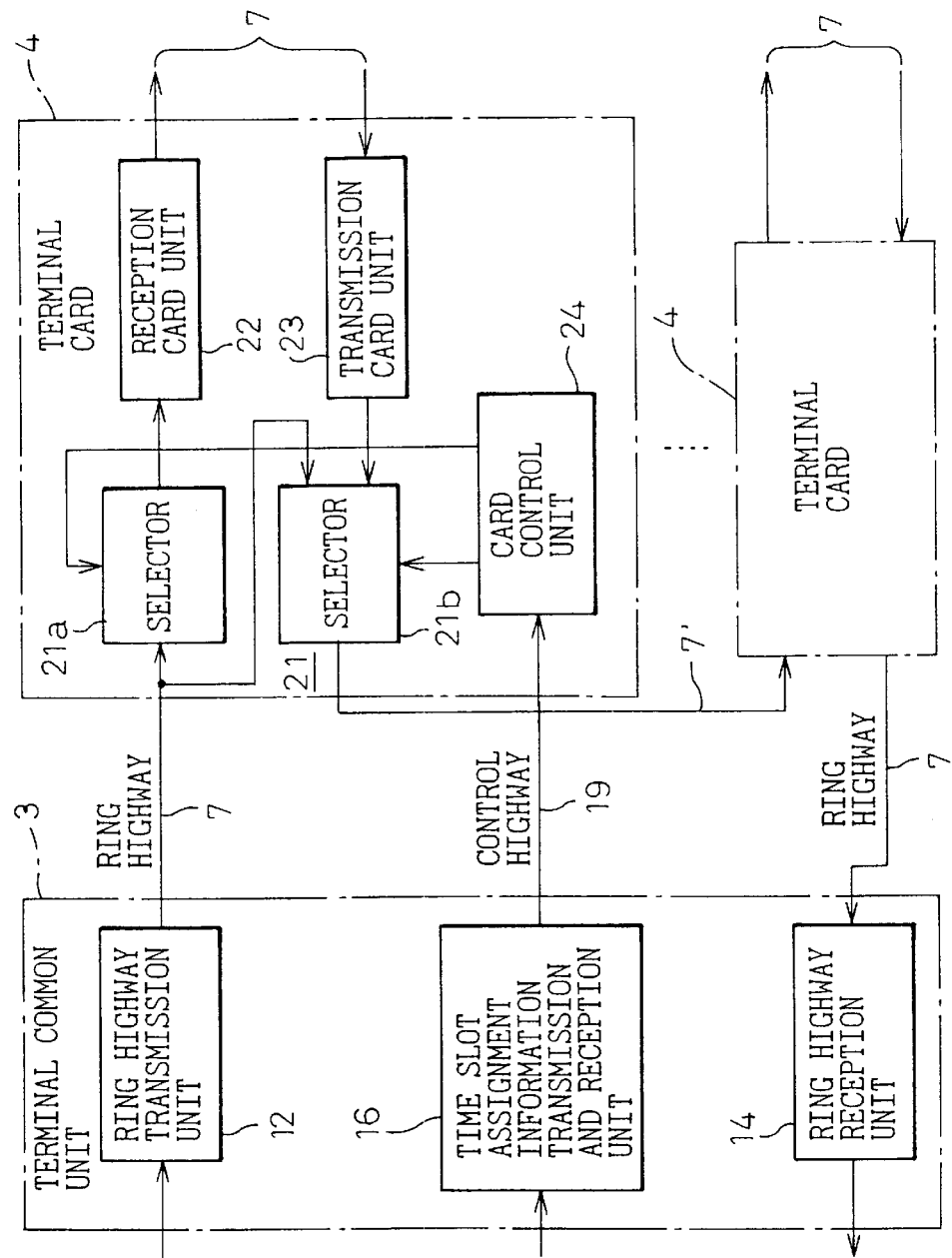
FIG. 4 is a view for explaining the configuration of both a part at which the terminal common unit and the terminal card are connected based on the first embodiment of the present invention.

FIG. 4 is a view for explaining the configuration of the part at which the terminal common unit and the terminal cards are connected based on the first embodiment of the present invention. Note that the same reference numerals as those in FIG. 1, FIG. 2, and FIG. 3 indicate the same parts. Reference numerals 21a and 21b indicate selectors which constitute the add/drop unit 21 in FIG. 3.

The ring highway 7 is connected to the selectors 21a and 21b of the terminal card 4 and is connected to an adjoining other terminal card 4 (one dot-chain line in the figure) via the selector 21b and the ring highway 7'. Accordingly, any number of terminal cards may be connected between the ring highway transmission unit 12 and the ring highway reception unit 14 of the terminal common unit 3 via the ring highway 7.

The control information is transferred from the time slot assignment information transmission and reception unit 16 of the terminal common unit 3 to the card control unit 24 in the terminal card 4 via the control highway 19. Namely, each terminal card 4 is connected to the ring highway 7 and the control highway 19. Further, the card control unit 24 controls the selectors 21a and 21b according to the assignment information of time slots contained in the control information from the terminal common unit 3, drops the data in the time slot on the ring highway 7 by the selector 21a and transfers the same to the reception card unit 22, and adds the data from the transmission card unit 23 to the time slot on the ring highway 7 by the selector 21b and transmits the same.

Figure 5:
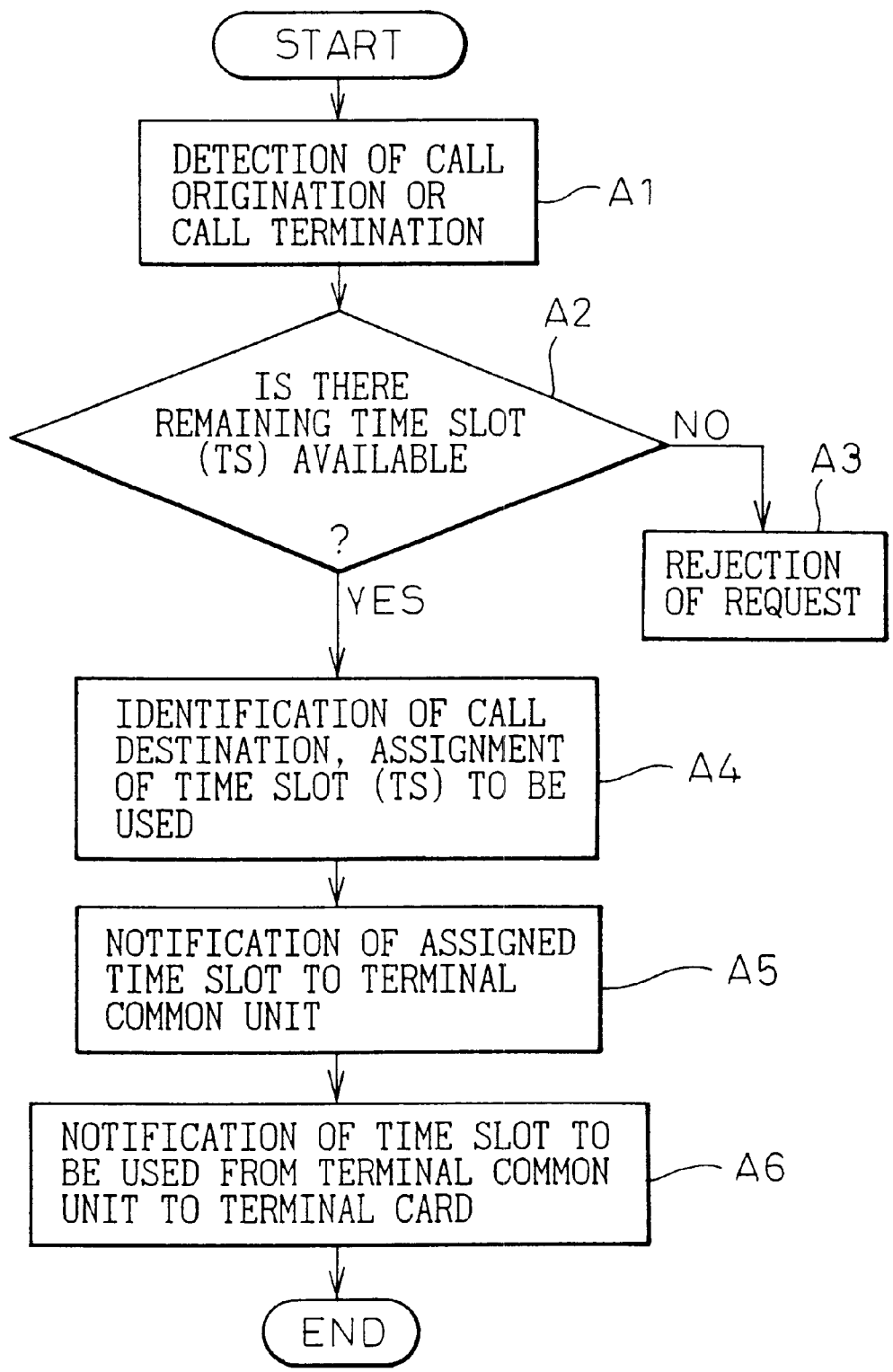
FIG. 5 is a flow chart of an operation based on the first embodiment of the present invention.

FIG. 5 is a flow chart of the operation based on the first embodiment of the present invention. For example, when the control unit 8 detects a call origination from a subscriber terminal connected via the terminal card 4 or a call origination from a subscriber terminal or a call termination to the subscriber terminal (A1), it judges whether or not there is a remaining time slot (TS) which can be used (A2) and, in the case there is none remaining, i.e., the state is the "all busy", rejects the request (A3).

Further, when there is a remaining time slot (TS), it identifies the destination of connection of the call and assigns the time slot (TS) to be used (A4). Then, the control unit 8 notifies this assigned time slot (TS) to the terminal common unit 3 via the control highway 19 (A5). The terminal common unit 3 notifies the assigned time slot (TS) from the time slot assignment information transmission and reception unit 16 (refer to FIG. 2 or FIG. 4) to the designated terminal card 4 for which the call origination or call termination was detected (A6).

The card control unit 24 of the designated terminal card 4 (FIG. 4) receives and processes the notification and controls the selectors 21a and 21b at the timing of the assigned time slot so as to transfer the data with the subscriber terminal or remote hub equipment connected to the designated terminal card 4.

Figure 6:
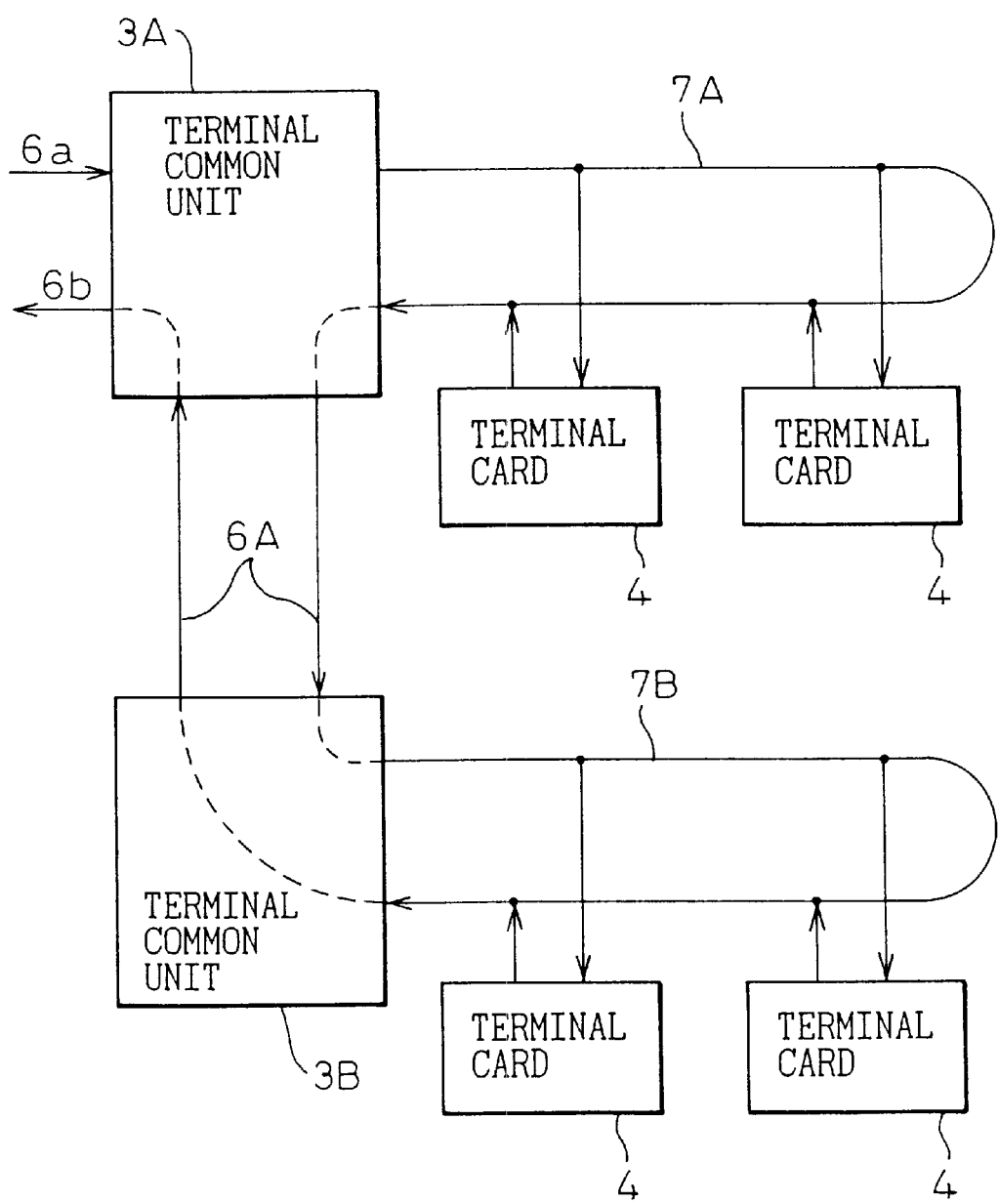
FIG. 6 is an explanatory view of principal parts in a second embodiment of the present invention.

FIG. 6 is an explanatory view of the principal parts in a second embodiment of the present invention, in which the terminal common units 3A and 3B are connected by a highway 6A and in which both a ring highway 7A connected to the terminal common unit 3A and the ring highway 7B connected to the terminal common unit 3B are connected in series with the highways 6a and 6b.

Namely, the illustrated arrangement shows a case where two ring highways 7A and 7B are connected in series. Another structure can be adopted in which ring highways connected to two or more terminal common units (3) are sequentially and serially connected by the highway (6A) among the terminal common units, so that one ring highway is connected to the highways 6a and 6b on the highway interface unit (2) side. Accordingly, even in a case where there is a limit etc. on the physical arrangement of the terminal cards 4, the terminal cards 4 can be connected so as to effectively utilize the bandwidth of the ring highway.

Further, it is also possible to omit the highway interface unit 2 and sequentially and serially connect ring highways connected to the terminal common unit to the downstream highway 5a and the upstream highway 5b of the time switch 1 (refer to FIG. 1) so as to constitute a single ring highway.

Figure 7:
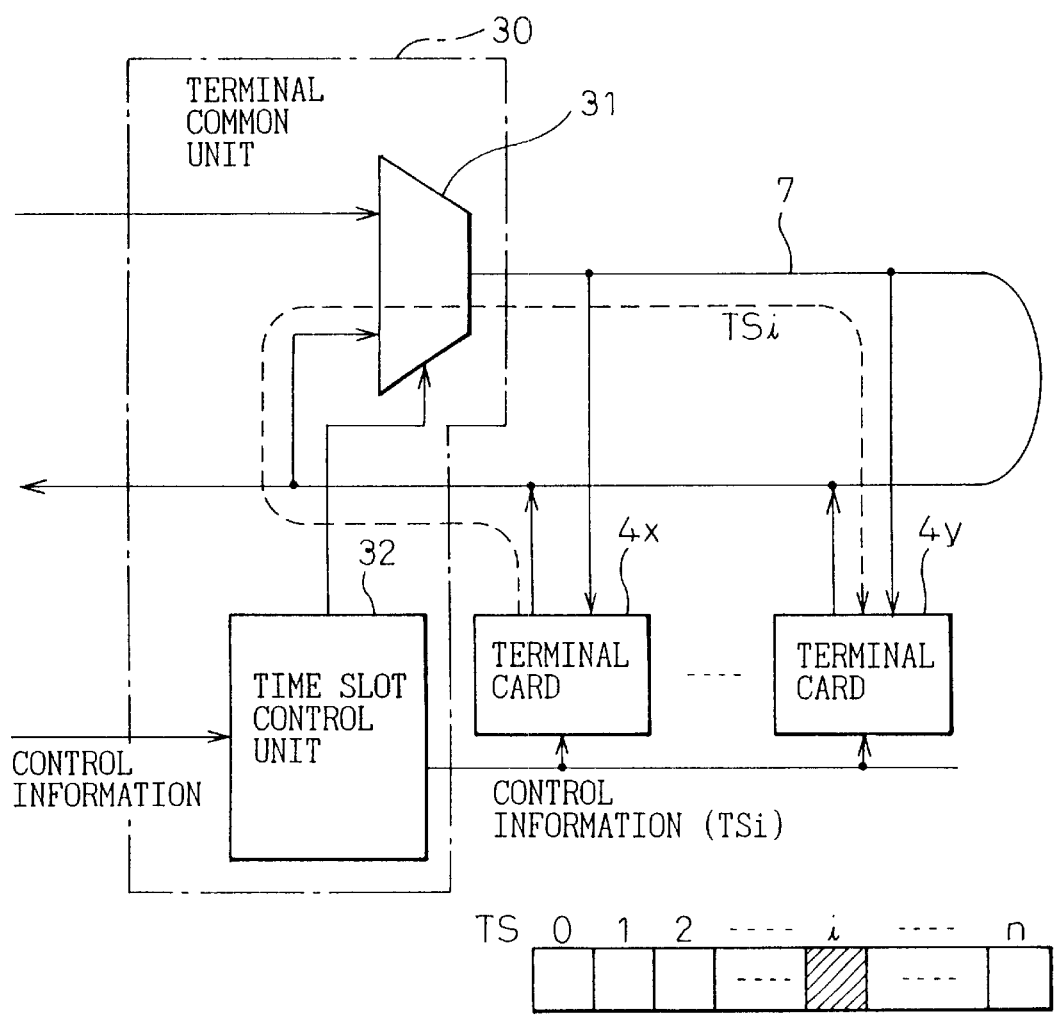
FIG. 7 is an explanatory view of the principal parts in a third embodiment of the present invention.

FIG. 7 is an explanatory view of the principal parts in a third embodiment of the present invention. It is constituted providing a selector 31 in the terminal common unit 30 and controlling the selector 31 by a time slot control unit 32 corresponding to the card control unit 24. For example, when communicating between terminal cards 4x and 4y connected to the same ring highway 7, for example, a time slot TSi (shown at the lower position in the figure) on the ring highway 7 is assigned by using the control information. Further, the time slot control unit 32 transmits control information in which the terminal cards 4x and 4y are specified.

By this, the time slot control unit 32 controls the selector 31 and the terminal cards 4x and 4y. For example, the terminal card 4x adds the data to the time slot TSi and transmits the same to the ring highway 7. Further, the selector 31 in the terminal common unit 30 returns only the data of the time slot TSi for transmission to the ring highway 7 again. It transmits the data of the other time slots to the highway on the highway interface unit (2) side. Then, the data of the time slot TSi on the ring highway 7 is dropped in the terminal card 4y and extracted.

Alternatively, the terminal card 4y adds the data to the time slot TSi of the ring highway 7, while the terminal card 4x drops the data from the time slot TSi of the ring highway 7. By this, it becomes possible to transfer data between the terminal cards 4x and 4y connected to the same ring highway 7 by using the hatched time slot TSi among the time slots TS0 to TSn shown at the lower position of the figure. Accordingly, there is the advantage that the processing by the time switch 1 can be omitted. Note that it is also possible to assign the time slot used for the data transfer from the terminal card 4x to the terminal card 4y, which time slot is different from the time slot used for the data transfer from the terminal card 4y to the terminal card 4x, and it is also possible to assign a plurality of time slots in accordance with the available bandwidth.

Figure 8:
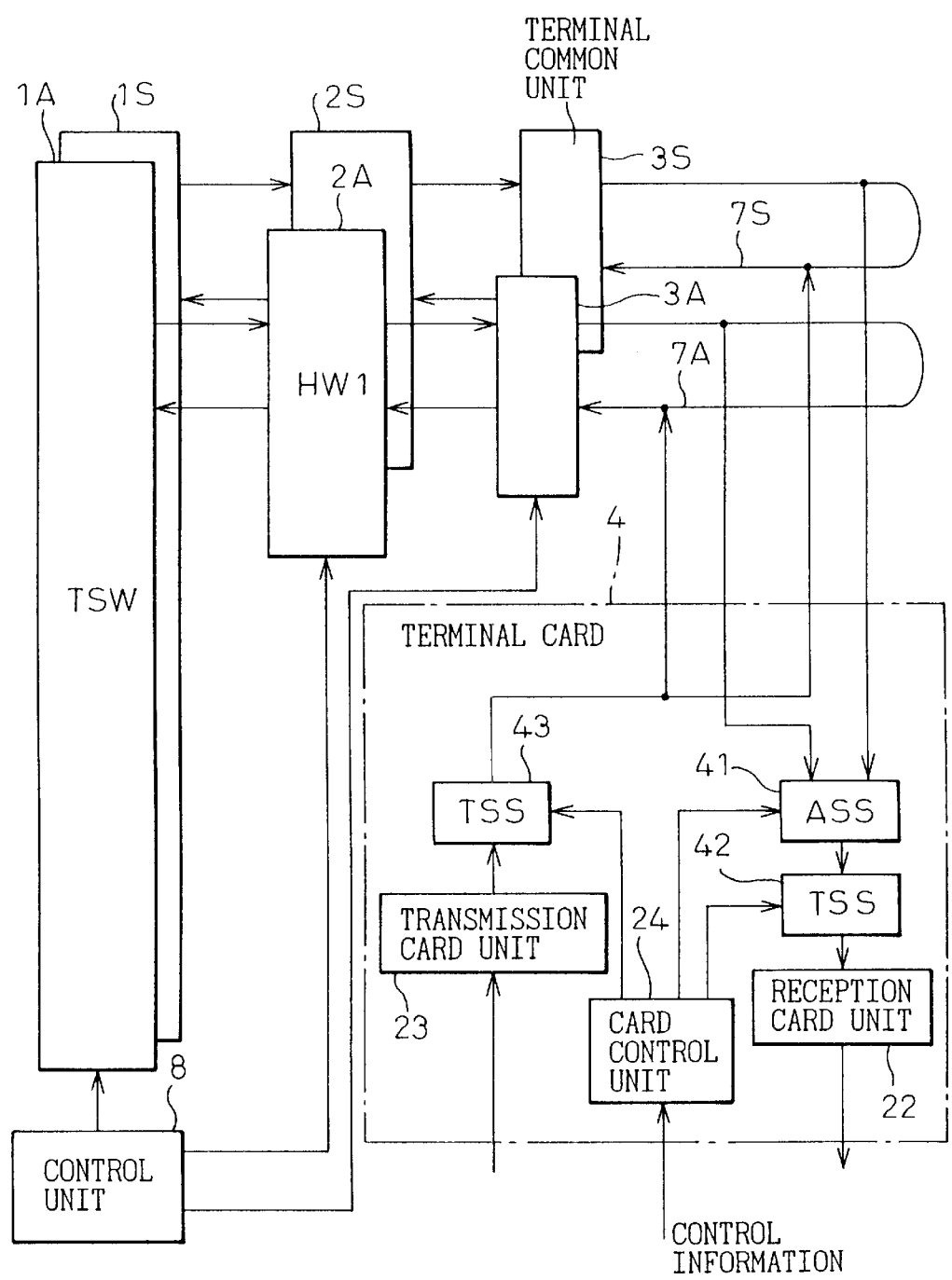
FIG. 8 is an explanatory view of the principal parts in a fourth embodiment of the present invention.

FIG. 8 is an explanatory view of the principal parts in a fourth embodiment of the present invention. This shows a case of a duplex configuration. The same reference numerals and symbols as those in the above figures indicate the same parts. Note that A denotes a working side (active side), and S denotes a protection side (standby side). Further, the terminal card 4 is provided with a selector (ASS) 41 for switching between the working side and the protection side and selectors (TSS) 42 and 43 corresponding to the selectors 21a and 21b (refer to FIG. 4) and switches between the working side and protection side highways 7A and 7S by the selector 41.

The exchange adopts the duplex configuration for improvement of the reliability. The control unit 8 controls to use a normal side as the working side for performing the exchange processing. Therefore, a duplex configuration is also given to the ring highways 7A and 7S together with the duplex configuration time switches 1A and 1S, highway interface units 2A and 2S, and the terminal common units 3A and 3S. Thus the terminal card 4 is provided with the selector 41 for selecting either of the ring highways 7A and 7S of the working side and the protection side to receive the data. The configuration containing this selector 41 and the card control unit 24 constitutes the selective switch unit of the duplex ring highway.

This terminal card 4 controls the selector 41 by the card control unit 24 operating according to the control information coming via the terminal common units 3A and 3S or the control information from the control unit 8, selects the working side of the duplexed ring highways 7A and 7S, drops the data of the assigned time slot by the selector 42, and transfers the same to the reception card unit 22. Further, it adds the data from the transmission card unit 23 to the assigned time slot via the selector 43 and transmits it to both the ring highways 7A and 7S of the working side and the protection side.

Figure 9:
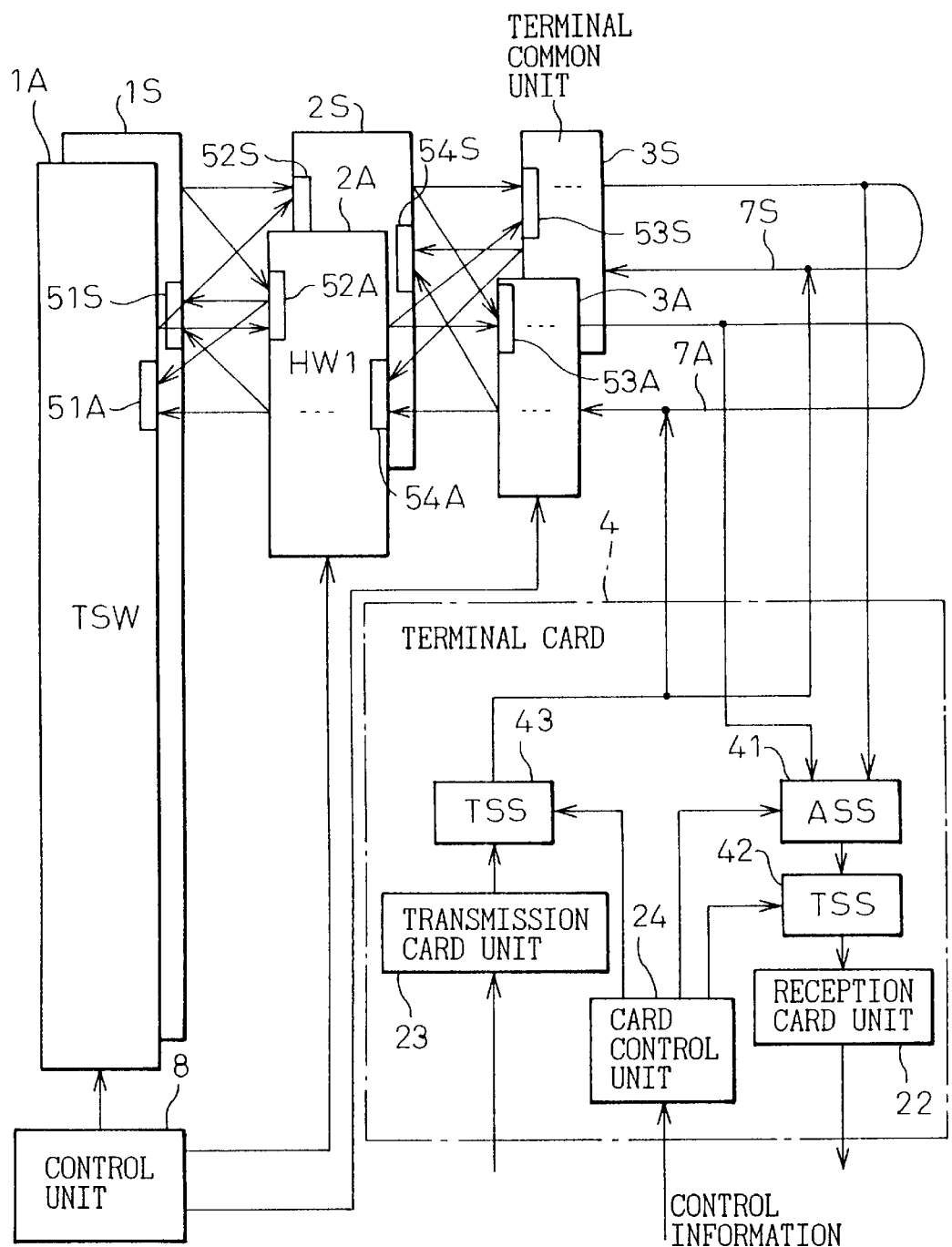
FIG. 9 is an explanatory view of the principal parts in a fifth embodiment of the present invention.

FIG. 9 is an explanatory view of the principal parts in a fifth embodiment of the present invention. The same reference numerals as those of FIG. 8 indicate the same parts. Reference numerals 51A to 54A and 51S to 54S denote selective switch units for selecting and switching the working side of each of the duplex highways and the cross-connecting highways. As mentioned above, the terminal card 4 is connected to the duplex ring highways 7A and 7S via a selective switch unit such as the selector 41 and can be selectively connected to the normal ring highway side.

Further, cross-connecting highways are provided together with the highways between the duplex configuration time switches 1A and 1S, the highway interface units 2A and 2S, and the terminal common units 3A and 3S, respectively. The highway of the normal side is selected and switched by the selective switch units 51A to 54A and 51S to 54S controlled by the control unit 8. For example, the time switch 1A switches the highways between the highway interface units 52A and 52S by the selective switch unit 51A, and the highway interface unit 52A switches the highways between the time switches 1A and 1S by the selective switch unit 51A.

Further, the terminal common unit 3A switches the highways between the highway interface units 52A and 52S by the selective switch unit 53A, while the highway interface units 52A and 52S switch the highways between the terminal common units 3A and 3S by the selective switch unit 54A.

Accordingly, using the selective switch units 51A to 54A and 51S to 54S, it is possible to selectively connect to the working side by the selective switch unit such as selector 41 etc. in the terminal card 4 by making, for example, the time switch 1A, the highway interface unit 2S, and the terminal common unit 3A the working side and accordingly making the ring highway 7A the working side. Thus, even if a fault occurs in one side, the exchange processing can be continued by the selective switching of the cross-connecting highways so far as a fault does not simultaneously occur in the same functional units. Due to this, the increase etc. of the terminal cards 4 are facilitated and, at the same time, a higher reliability can be achieved.

The present invention is not limited to only the above embodiments. Various additions and modifications can be made. For example, it is also possible to connect the highway from the time switch 1 to the ring highway 7 via the terminal common unit 3 and also connect a plurality of terminal cards 4 to the ring highway 7. Further, it is also possible to adopt a configuration of a combination of the above embodiments.

Summarizing the effects of the present invention, as explained above, since the present invention provides an exchange using the synchronous transfer mode (STM) and performing time division exchange, wherein the ring highway 7 is connected to both the upstream highway 5b and the downstream highway 5a coupled to the time switch 1 via the terminal common unit 3, a plurality of terminal cards 4 are connected to this ring highway 7, and the drop and add of the data of the time slot on the ring highway 7 are carried out in each terminal card 4 according to control information on assignment of time slots, there are the advantages that the increase and removal of terminal cards 4 become easy and the time slots on the higher rank side highway of the terminal common unit 3 can be effectively utilized.

Further, since it is also possible to sequentially connect in series a plurality of ring highway 7 to which terminal common units are connected using highways between the terminal common units so as to connect the terminal cards 4 while constituting a single ring highway as a whole. Thus, it becomes easier to increase etc. the terminal cards 4 in accordance with the size of the system of the exchange.

Further, since the ring highway is duplexed together with the duplexing of the time switch and a selective switch unit is provided in each of terminal cards 4 connected to the duplexed ring highways, the normal side can be selected and connected. For this reason, the reliability can be improved. In this case, by cross-connecting the time switch and the highway interface units and terminal common units by highways, a further improvement of reliability can be achieved.

What is claimed is:

1. An exchange for performing exchange processing, by a time switch, of time division multiplexed data provided with:

a downstream highway and an upstream highway coupled to the time switch for switching time slots and highways;

a ring highway connected to these upstream and downstream highways via a terminal common unit;

a terminal card containing an add/drop unit connected to this ring highway for dropping and adding the data of an assigned time slot on the ring highway; and a card control unit in the terminal card for controlling this add/drop unit by receiving control information regarding the assignment of time slots to the terminal card.

2. An exchange as set forth in claim 1, wherein a plurality of terminal common units each linked with one of a plurality of ring highways are connected in series with the upstream and downstream highways coupled to the time switch to constitute a ring-like configuration as a whole and a plurality of terminal cards are connected to the ring highways.

3. An exchange as set forth in claim 1, wherein provision is made of a control unit for the exchange to control the interchanging of time slots in the time switch and the assignment of time slots to the terminal cards.

4. An exchange as set forth in claim 1, wherein the time switch, the terminal common unit, the upstream and downstream highways, and the ring highway are arranged in a duplex configuration having a working side and a protection side, the terminal cards are connected working and protection ring highways, and working and protection switch control units are provided in the terminal common units and the terminal cards.

5. An exchange as set forth in claim 1, wherein the time switch, the terminal common unit, the upstream and downstream highways, and the ring highway are arranged in a duplex configuration having a working side and a protection side, provision is made of highways cross-connecting with working side and protection side upstream and downstream highways between working side and protection side time switches and terminal common units, provision is made of a selective switch unit, in the terminal common unit, for selecting either of working side and protection side duplexed highways and cross-connecting highways, and provision is made of a selective switch unit, in the terminal card, for selecting either of working side and protection side ring highways.

* * * * *